US 8,055,286 B1

(12) United States Patent
Reeves et al.

(10) Patent No.: US 8,055,286 B1
(45) Date of Patent: Nov. 8, 2011

(54) MODIFICATION OF EN-ROUTE MESSAGE TO ADD DESTINATION PORT NUMBER SELECTED BASED AT LEAST IN PART ON MESSAGE ORIGINATOR

(75) Inventors: Raymond E. Reeves, Olathe, KS (US); Ryan A. Wick, Apollo Beach, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 682 days.

(21) Appl. No.: 12/199,294

(22) Filed: Aug. 27, 2008

(51) Int. Cl.
*H04W 4/00* (2009.01)

(52) U.S. Cl. ............. 455/466; 455/412.1; 455/412.2; 455/422.1; 709/238; 370/902; 370/351

(58) Field of Classification Search .......... 455/466, 455/412.1, 412.2; 709/238–244; 370/902, 370/351
See application file for complete search history.

(56) References Cited

U.S. PATENT DOCUMENTS

| 6,078,820 | A | 6/2000 | Wells et al. |
| 7,911,946 | B2 * | 3/2011 | Poli et al. ............. 370/230 |

| 2003/0139193 | A1 | 7/2003 | Buckley |
| 2007/0025301 | A1 * | 2/2007 | Petersson et al. ......... 370/338 |
| 2007/0189312 | A1 * | 8/2007 | Acharya et al. .......... 370/401 |
| 2007/0282959 | A1 * | 12/2007 | Stern ...................... 709/206 |
| 2008/0144796 | A1 * | 6/2008 | Ringland et al. ....... 379/210.01 |

OTHER PUBLICATIONS

OpenBSD, "PF: Network Address Translation (NAT)," http://www.openbsd.org/faq/pf/nat.html, printed from the World Wide Web, dated Jul. 27, 2008.

* cited by examiner

*Primary Examiner* — Nick Corsaro
*Assistant Examiner* — Vladimir Magloire (57) ABSTRACT

Disclosed is a method and system in which an intermediary is provided within a communication path through which a message is transmitted from its originator to a client device, and the intermediary operates to insert into the message a target port number based at least in part on the originator of the message. In a scenario where the message originator provided or is otherwise associated with a given application group on the client device, the intermediary may thus modify the message to have the message designate as target port number the port number that the client device associates with the application group. Ultimately, when the client device receives the message, the client device would read the target port number and responsively route the message to the appropriate application or application group.

20 Claims, 5 Drawing Sheets

MODIFICATION OF EN-ROUTE MESSAGE TO ADD DESTINATION PORT NUMBER SELECTED BASED AT LEAST IN PART ON MESSAGE ORIGINATOR

BACKGROUND

In general, when an application server or other network entity transmits a message to a client device, logic at the client device must process the message and forward the message to appropriate client application for handling. To facilitate routing the message within the client device to the appropriate application, the client device may have data that correlates port numbers with particular applications, and the incoming message may carry a target port number. Upon receipt of the message, the client device may thus read the target port number specified by the message and may refer to the data to determine which application corresponds with that port number. The client device may then pass the message to that application.

As a client device gets loaded with applications, it is theoretically possible that the client device may run out of port numbers to be correlated with the applications. When that happens, at issue may then be how to facilitate routing of incoming messages to appropriate applications on the device.

OVERVIEW

Disclosed herein is a method for routing messages to particular applications on a client device. The method stems initially from the realization that particular application providers may each provide or otherwise be associated with a group of applications on a client device. For instance, one company may provide a group of office applications on the device, another company may provide a group of media applications on the device, and another company may provide a group of utility applications on the device.

In accordance with one aspect of the method, target port numbers on the client device are conserved by programming the device with a message-management module respectively for each group of applications, and associating each message-management module (rather than the applications themselves) with a port number. In operation, when a message to the client device is destined to an application that is a member of a given application group, the message would be structured to designate the target port number of the application group's message-management module. Thus, when the client device receives the message, the client device will route the message to the application group's message-management module. In turn, the application group's message-management module will then route the message to the appropriate application of the group. (by reference a sub-port number designated by the message, or through some other mechanism).

In accordance with another aspect, an intermediary is provided within the network path through which a message is transmitted from its originator to the client device, and the intermediary operates to insert into the message a target port number based at least in part on the originator of the message. In a scenario where the message originator provided or is otherwise associated with a given application group on the client device, for example, the intermediary may thus modify the message to have the message designate as target port number the port number that the client device associates with the application group's message-management module. Consequently, when the client device receives the message, the client device would read the target port number and responsively route the message to the message application group's message-management module, and the message-management module may then route the message to the appropriate application of the group.

More generally, this type of intermediary function can be applied in order to add a target port number into a message regardless of application grouping. Generally, the intermediary function can select a target port number corresponding with the originator of the message and can modify the message to designate the selected target port number. Upon receipt of the message, the client device may then route the message to an application that is associated with the designated port number.

In practice, a network service provider may provision or re-provision a client device with correlations between port numbers and application logic on the client device, and the network service provider may implement the present intermediary function to insert target port numbers based at least in part on message originator. Advantageously, the network service provider may thereby exert control over the manner in which messages are routed within their destination client devices, thus permitting conservation of port numbers and other message management.

These as well as other aspects, advantages, and alternatives will become apparent to those of ordinary skill in the art by reading the following detailed description, with reference where appropriate to the accompanying drawings. Further, it should be understood that the foregoing overview, like other description and drawings provided throughout this document, is intended to illustrate the present method by way of example only.

DETAILED DESCRIPTION

The present method will be described by way of example in the context of short message service (SMS) messaging, which is well known in the art as a specific mechanism for exchanging text messages with cell phones and other wireless communication devices (WCDs), as defined by industry standards such as IS-41, TIA/EIA-637/IS-637, and Short Message Peer-to-Peer (SMPP) protocol for instance. However, those of ordinary skill in the art will appreciate that the method is not limited to SMS messaging or to communication with wireless communication devices but can be more generally applied with respect to transmission of any types of messages (e.g., packets, e-mail messages, instant messages, SMS messages, etc.) and in the context of message transmission to any types of client devices (e.g., personal computers, appliances, cell phones, personal digital assistants, etc.), to facilitate routing of the messages to appropriate application logic on the client devices.

Referring to the drawings, as noted above, FIG. 1 is a simplified block diagram of an example communication system in which the present method can be implemented. In particular, the figure depicts three representative message originators 12, 14, 16, and three representative destination WCDs 18, 20, 22. Situated between the message originators and the WCDs is then a representative communication path including a network 24, a short message service center (SMSC) 26, and a radio access network (RAN) 28. In practice with this arrangement, when any one of the message originators sends a message destined one of the WCDs, the message will pass via network 24, through SMSC 26, via RAN 28, and over an air interface to the destination WCD.

Figure 1:
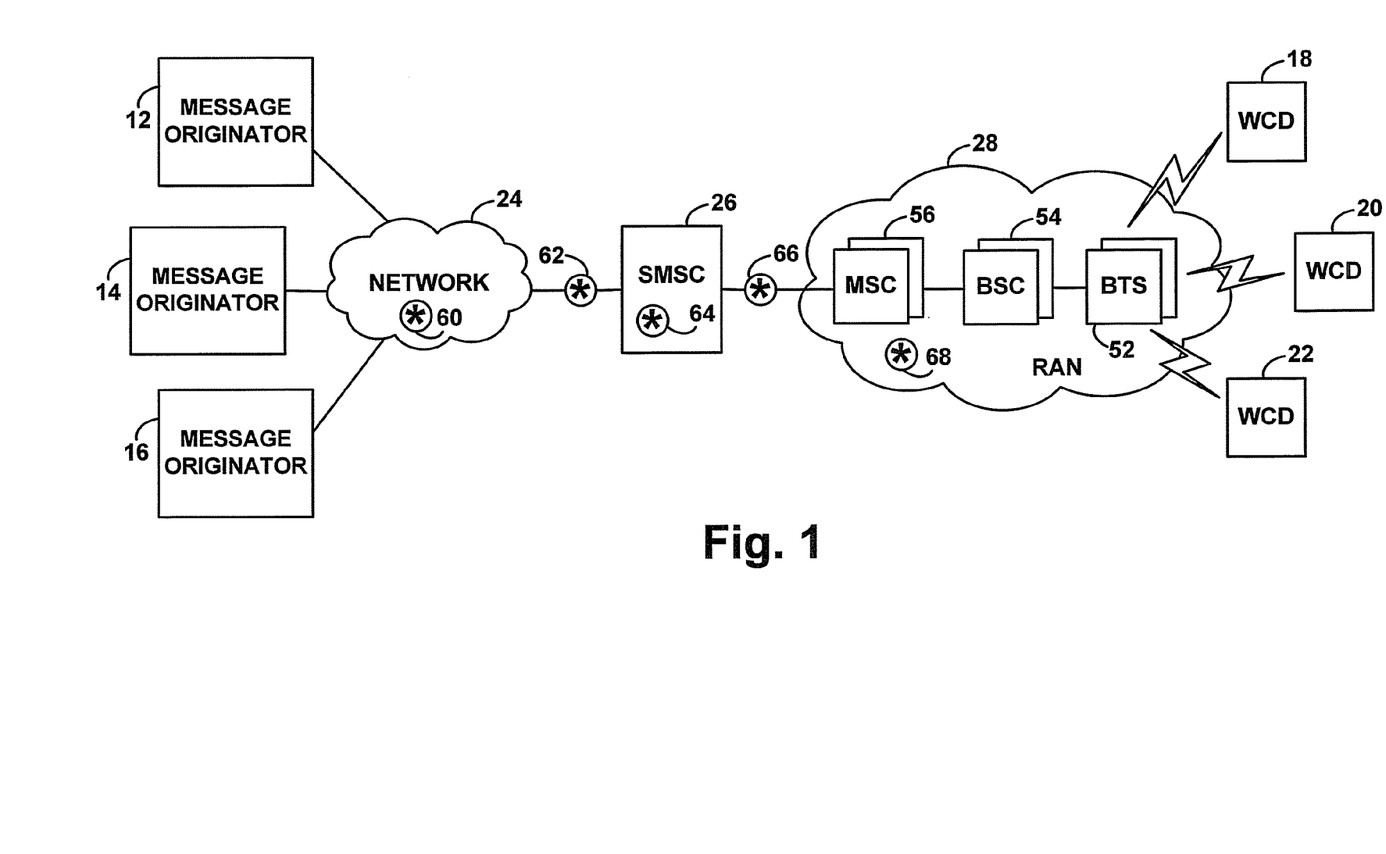
FIG. 1 is a simplified block diagram of a communication system in which the exemplary method can be implemented.

In general, each message originator is equipped to send a message that is to be delivered to a particular target device, such as one of the WCDs shown. Thus, the message originator preferably generates the message in the first place, such as by encapsulating message payload into one or more headers that specify an address of the message originator as a source address and an address of the target device as a destination address. And the message originator then outputs the message for transmission through one or more networks or other communication paths to the target device.

To carry out these functions, each message originator preferably takes the form of a computing/communication device, such as a personal computer, application server, WCD, or other entity now known or later developed. Such an entity would typically include a processor programmed to generate and output the message, and a network communication interface through which to output the generated message for transmission to the target device. In a preferred embodiment, each message originator is owned and operated by a particular organization, such as an particular application or content provider for instance, and the same organization may be a provider of particular application logic on one or more of the target WCDs.

In FIG. 1, the three representative message originators 12, 14, 16 are shown coupled with network 24, which in turn connects with SMSC 26. Network 24 may be the Internet or may comprise some other public or private network that is arranged to carry messages from one point to another. In a rudimentary embodiment, network 24 may be a simple end-to-end connection respectively between each message originator and the SMSC 26. Alternatively, network 24 can be a more complex network, including any number of gateways, routers, proxies, and other intervening elements.

Each of the WCDs 18, 20, 22 may likewise take various forms, examples of which include cell phones, personal digital assistants, wirelessly equipped personal computers, and wirelessly-equipped appliances. Preferably, each WCD functions as a short message entity (SME) capable of receiving and processing SMS messages. Each WCD is further programmed with a plurality of applications, each of which serves a discrete device function that may or may not involve user interaction. Examples of such applications include, without limitation, word processing, phone book, calendar, spreadsheet, games, audio player, video player, web browser, image management, graphics editing, utilities, and other applications now known or later developed.

Figure 2:
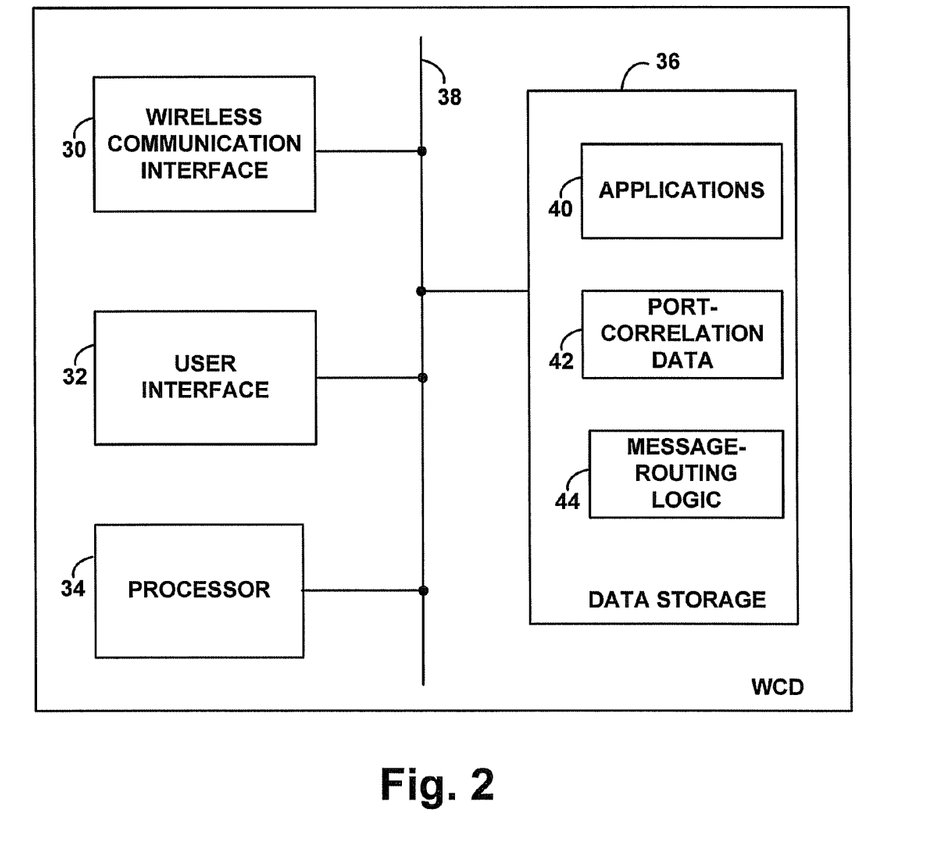
FIG. 2 is a simplified block diagram showing components of an exemplary client device operable within the exemplary communication system.

Turning briefly to FIG. 2, a simplified block diagram depicting functional components of an exemplary WCD is provided. As shown in FIG. 2, the WCD includes a wireless communication interface 30, a user interface 32, a processor 34, and data storage 36, all of which are coupled together by a system bus or other connection mechanism 38.

Wireless communication interface 30 may comprise a cellular wireless chipset of the type arranged to engage in air interface communication with RAN 28 according to an agreed air interface protocol, such as such as CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth or others now known or later developed. Further, the wireless communication interface 30 preferably includes one or more antennas (not shown) to facilitate air interface communication.

User interface 32 provides a mechanism through which a user can interact with the WCD. The user interface 72 may include input components such as a keypad, a microphone, a camera, and/or a touch-sensitive screen, and output components such as a display screen and loudspeaker. The user interface also preferably includes analog-digital conversion circuitry and underlying control logic for interfacing with a user, such as to convert digital content to a presentable analog form and to receive analog content and convert it to digital form for transmission or other processing.

Processor 34 may comprise one or more general purpose processors (e.g., INTEL processors) and/or one or more specialized processors (e.g., digital signal processors and/or application specific integrated circuits). Data storage 34, in turn, may comprise one or more volatile and/or non-volatile storage components, such as magnetic, optical, or organic storage, and may be integrated in whole or in part with processor 32.

In the exemplary embodiment, as shown, data storage 34 contains various applications (i.e., program modules) 40 as noted above, which are preferably executable by processor 34 to carry out particular device functions. Further, the data storage 34 contains port-correlation data 42, which correlates various applications and/or groups of applications with particular target port numbers. And data storage 34 contains message-routing logic 44 executable by processor 34 to route received messages to particular applications, in accordance with the port-correlation data, for handling.

Figure 3:
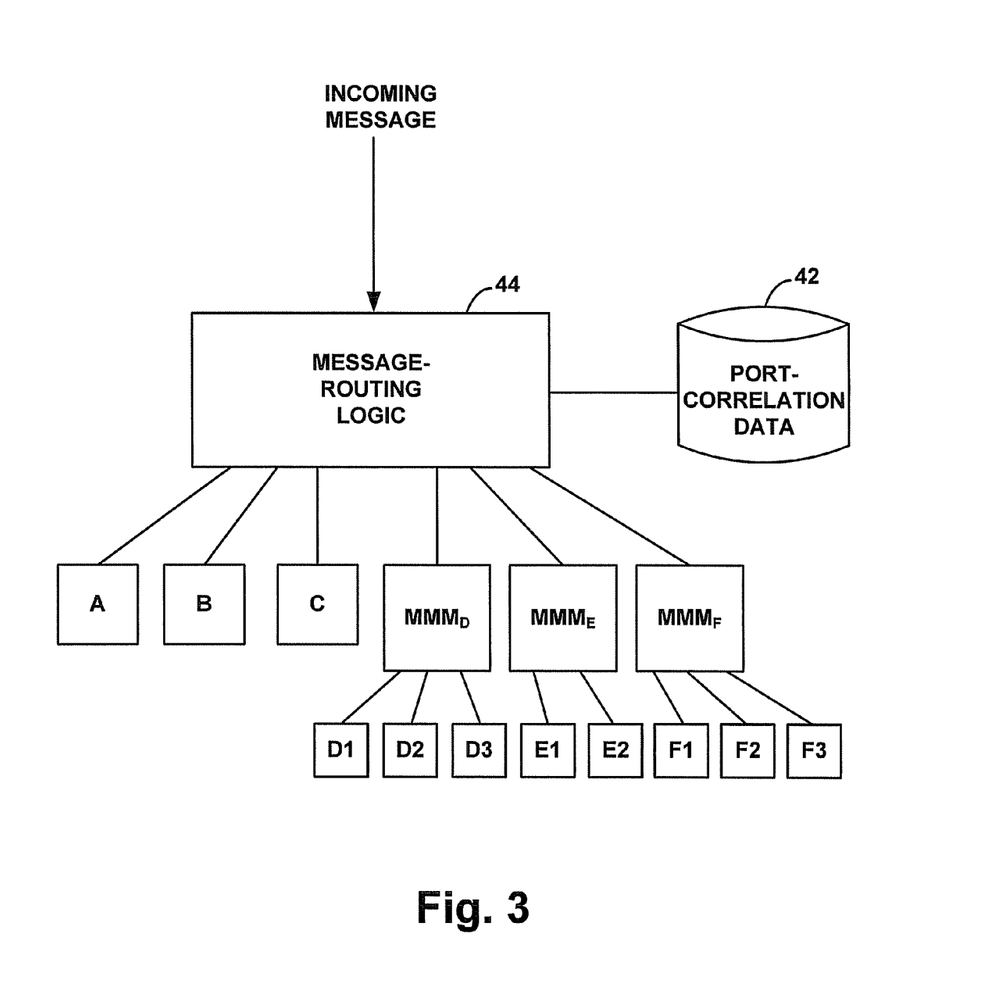
FIG. 3 is an illustration of how application logic can be organized within an exemplary client device.

FIG. 3 next depicts examples of how the applications in the example WCD may be organized, and how the port-correlation data 42 can be used by the message-routing logic to facilitate routing received messages to particular applications. As shown, message-routing logic 44 has access to the port-correlation data 42 and has access to the applications 40 so that the message-routing logic 44 can pass received messages to particular applications. In practice, for instance, when the WCD receives a message, processor 34 may execute message-routing logic to read the target port number in the received message, refer to port-correlation data 42 to determine the application or application group to which the message should be passed, and to then pass the message to the determined application or group, such as by calling the application or group management module and passing the messages, or a pointer to the message, as an argument for example.

FIG. 3 depicts a number of representative applications A, B, and C, and a number of representative application groups D, E, and F. Application group D is shown including representative applications D1, D2, and D3, and having a respective message-management program module $MMM_D$. Application group E is shown including representative applications E1 and E2, and having a representative message-management module $MMM_E$. And application group F is shown including representative applications F1, F2, and F3, and having a representative message-management module $MMM_F$. It should be understood that the numbers of applications defining a given application group can vary from those shown. Optimally, as noted above, each application group defines applications that are provided by or otherwise associated with a particular application provider or content provider, such as an entity that owns and operates a particular one of the message originators 12, 14, 16. Thus, in practice, where a WCD includes multiple applications provided by a common application provider, those applications would ideally be grouped into a discrete application group.

Port-correlation data 42 preferably contains data that correlates each application or group of applications with an associated port number, to facilitate routing of received messages to the appropriate application. To illustrate this relationship, FIG. 3 depicts example port numbers in association with each application or group. In particular, as shown, application A is associated with port number 100, application B is associated with port number 102, application C is associated with port number 104, application group D (and particularly, message-management module $MMM_D$), is associated with port number 106, application group E (and particularly, message-management module $MMM_E$), is associated with port number 108, and application group F (and particularly, message-management module $MMM_F$), is associated with port number 110.

With this arrangement, a message received by a WCD may designate a given target port that facilitates routing of the received message to the appropriate application or group.

For example, if the received message designates target port 102, then, in accordance with the port-correlation data 42, message-routing logic 44 would pass the message (e.g., at least the payload of the message) to application B for handling (e.g., presentation to a user, or invoking of one or more other useful device functions). As another example, if the received message designates target port 104, then, in accordance with the port-correlation data 42, message-routing logic 44 would pass the message to application C for handling.

On the other hand, if the received message designates port 106, then, in accordance with the port-correlation data 42, message-routing logic 44 would pass the message to message-management module $MMM_D$, for transmission in turn to a particular application. Upon execution, message-management module $MMM_D$ may then determine from the message which application in group D should receive the message and may pass the message to that application. In one embodiment, for instance, the message may contain a sub-port number that designates which of the applications in group D should receive the message. Given the three applications shown, for instance, the sub-port number may be 1, 2, or 3, corresponding respectively with application D1, D2, and D3. Message-management module $MMM_D$ may thus refer to that sub-port number to determine which application should receive the message and may then pass the message to that application. Or message-management module $MMM_D$ may determine the target application based on an analysis of the message content. For instance, the message payload may include a name of the application or other text that the message-management module would programmatically correlate with a particular target application. Similar processing can be carried out with respect to messages destined to the other application groups as well.

Turning back now to FIG. 1, each of the WCDs is shown being served by a representative RAN 28, which provides the WCD with network connectivity through which the WCD may receive messages and, depending on WCD capabilities, perhaps engage in communications with various entities on the public switched telephone network (PSTN) and/or packet-switched networks such as the Internet.

RAN 28 is depicted including one or more base transceiver stations (BTSs) 50, one or more base station controllers (BSCs) 52, and one or more mobile switching centers (MSCs) 54, although it should be understood that a suitable RAN could just as well take other forms ranging in degree of complexity. In general, each BTS 50 includes an antenna arrangement that radiates to define one or more wireless coverage areas in which served WCDs can communicate with the BTS and thus with the RAN, according to one of the air interface protocols noted above for instance. Each BSC 52 in turn controls one or more BTSs, performing functions such as managing handoff of WCDs from one coverage area to another for instance. And each MSC 54 controls one or more BSCs and typically provides connectivity with the PSTN (not shown).

Each WCD has a respective identifier that may serve as its address for receiving air interface communications transmitted to it by the RAN. By way of example, a WCD may have a unique mobile directory number (MDN), a unique International Mobile Subscriber Identity (IMSI), a unique MAC address, or some other identifier dynamically or statically assigned t the WCD. Further, each WCD may be provisioned with the data and logic described above, with the provisioning being conducted before initial distribution of the WCD to its end-user and/or through over-the air service provisioning transmissions from or through RAN 28 from time to time, such s to provide the WCD with new port-correlation data for instance.

SMSC 26 generally functions to store and forward SMS messages that are destined to client devices such as WCDs 18, 20, 22 for instance. As such, SMSC 26 may operate in accordance with industry standard procedures to receive messages formatted under the SMPP protocol or some other protocol, and to then determine the MSC that currently serves the target and to forward the messages over Signaling System #7 or some other protocol to that MSC for transmission in turn to the target WCD. Messages originally transmitted from a message sender in some other format (such as SMTP for instance) can be translated to SMPP format at an intervening gateway or other entity, or can arrive at the SMSC in a format other than SMPP.

An SMPP-formatted message typically includes, among other components, (i) a source address, (ii) a destination address, and (iii) short message text, each in a respective field. The source address may be a telephone number, short code, or some other form of address, enabling the recipient device to transmit a reply to the appropriate address. The destination address is the address of the target WCD (or other destination SME) and may thus take the form of a phone number or other target device address. The short message text then defines the message payload or body, to be displayed or otherwise processed by the recipient device. When the SMSC transmits the message to the MSC for transmission to the target device, the SMSC generally includes at least these same components in the message. Thus, when the target WCD receives the message, the message includes at least the source address, the destination address, and the short message.

The body of an SMS message can include a destination port number (i.e., target port number), typically as a control code followed by a port number. For instance, the beginning of the SMS message text may include the control code "//WMA" followed by a port number "123" as "//WMA123", which the recipient WCD would programmatically interpret to be a designation of port number "123." Further, the SMS message body can include a source port number as well, to facilitate routing a reply message to the appropriate port at the source address. For instance, the beginning of the SMS message text may include "//WMAport1port2", where "port1" would be the source port number and "port2" would be the destination port number.

As noted above, the present method provides for intermediating on a message that is en route from a message originator to a target device, to add into the message a destination port number that is selected based at least in part on the message originator, so that the message when received by the target device will include the added destination port number, and the target device will route the received message to particular application logic based on the added destination port number. The destination port number may be inserted into the message in place of an existing destination port number (such as one provided by the message originator), if any. Furthermore, the method may involve selecting the destination port number based on one or more additional criteria (together with message originator), such as the message destination and/or a footprint of the message itself.

In general, this port-insertion intermediation function can be carried out anywhere in the communication path between the message originator and the target device. FIG. 1 depicts several representative locations 60-68 at which the function can be carried out, by way of example in the exemplary communication system. Location 60 is generally anywhere in the network 24 or communication path connecting the message originator with the SMSC 26, such as at a gateway, router, or proxy within the network. Locations 62 and 64 are specifically at point of ingress into and egress out of the SMSC 26, which could be an advantageous locations to implement the method nearly at the SMSC without the need to modify the SMSC itself. Location 64 is the SMSC itself. And location 68 is generally anywhere in the RAN 28, such as at MSC 56, BSC 54, or BTS 52 for instance.

Figure 4:
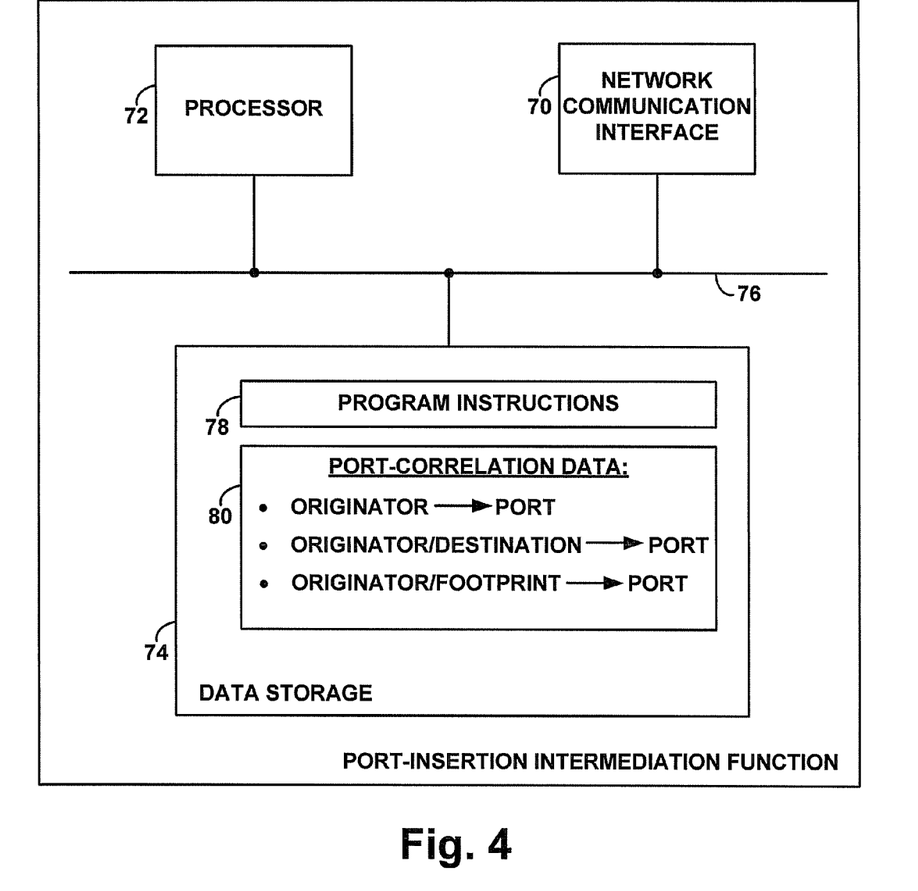
FIG. 4 is a simplified block diagram showing functional components of an exemplary port-insertion intermediation function.

FIG. 4 is a simplified block diagram depicting functional components that can be included at an entity that implements the port-insertion intermediation function in accordance with the preferred method. If the function is implemented at an entity that carries out other functions as well (such as the SMSC, or a RAN component, for instance), the components shown in FIG. 4 may include components that are normally included in the entity itself, with further logic, data, and/or other elements added to facilitate application of the present method.

As shown in FIG. 4, the representative entity includes a network communication interface 70, a processor 72, and data storage 74, all of which are coupled together by a system bus, network, or other connection mechanism 76. Generally, the network communication interface 70 includes one or more wired or wireless network interface components to facilitate receiving a message en route and transmitting the message (modified to include the selected destination port number) along for ultimate receipt by its destination. Processor 72 comprises one or more general purpose processors (e.g., INTEL processors) and/or one or more specialized processors (e.g., digital signal processors and/or application specific integrated circuits). And data storage 74, comprises one or more volatile and/or non-volatile storage components, such as magnetic, optical, or organic storage, possibly integrated in whole or in part with processor 72.

Data storage 74 holds program instructions 78 executable by processor 72 to carry out the port-insertion intermediation function of the present method, although it should be understood that the function could just as well be implemented by hardware, firmware, or any other type of logic. To facilitate implementation of the port-insertion intermediation function, data storage 74 further contains port-correlation data 80, which specifies correlations between message originators and destination port numbers. The port-correlation data 80, which may be loaded into the data storage by a wireless service provider or other entity, preferably specifies a destination port number respectively for each of a plurality of source addresses or otherwise for each of a plurality of message originators. Thus, upon receipt of a message en route from a message originator to a target device, processor 72 can read the source address from the message and then refer to the port-correlation data 80 to determine the corresponding destination port number to add to the message, and the processor may responsively add that destination port number to the message.

Optimally, the port-correlation data 80 may further specify destination port numbers corresponding with message originators for messages destined to particular devices and/or for messages bearing particular message footprints (e.g., particular data or form of data carried by the message), and perhaps for still other additional factors such as time of day for instance.

For example, the port-correlation data 80 may be keyed generally to message originator and may then specify for each given message originator which destination port number to use based on the identity of the destination device (or the port-correlation data 80 may otherwise correlate pairs of message originators and destination devices with particular destination port numbers). Thus, upon receipt of a message en route from a message originator to a destination address, processor 72 can read the source address and destination address from the message and then refer to the port-correlation data 80 to determine the corresponding destination port number to add to the message, and the processor may responsively add that destination port number to the message.

Furthermore, the port-correlation data 80 may include data that correlates target devices with service providers that serve or provide the target devices, and the port-correlation data 80 may then specify for each message originator which destination port number to use based on the identity of the service provider corresponding with the target device. For instance, various mobile virtual network operators (MVNO) may provide service for various WCDs. Upon receipt of a message en route from a message originator to a particular WCD, the processor may refer to the port-correlation data 80 to determine the MVNO corresponding with the WCD, and the processor may then determine from the port-correlation data which destination port number corresponds with the message originator for the determined MVNO. The processor may then add that destination port number to the message.

As another example, the port-correlation data 80 may be keyed generally to message originator and may then specify for each given message originator which destination port number to use based on a footprint of the message, such as based on the presence of particular text (whether or not contiguous), text structure, or other content of the message (or the port-correlation data 80 may otherwise correlate pairs of message originators and message footprints with particular destination port numbers). Advantageously, this can enable the message originator itself to exert some control over which destination port number the intermediary adds to the message, by the message originator including a particular message footprint. In practice, upon receipt of a message en route from a message originator to a target device, processor 72 can then read the source address from the message and scan the message in search of any of various predefined message footprints, and the processor may then refer to the port-correlation data 80 to determine the corresponding destination port number to add to the message.

As still another example, the port-correlation data 80 may be keyed generally to message originator and may then specify for each given message originator which destination port number to use based on both destination address and content footprint (or the port-correlation data 80 my otherwise correlate groups of message originators, destination addresses, and message footprints with particular destination numbers). Thus, upon receipt of a message en route from a message originator to a target device, processor 72 can read the source and destination addresses from the message and scan the message (e.g., the bearer data defined by the message body), in search of any of various message footprints, and the processor may then refer to the port-correlation data 80 to determine the corresponding destination port number to add to the message.

Figure 5:
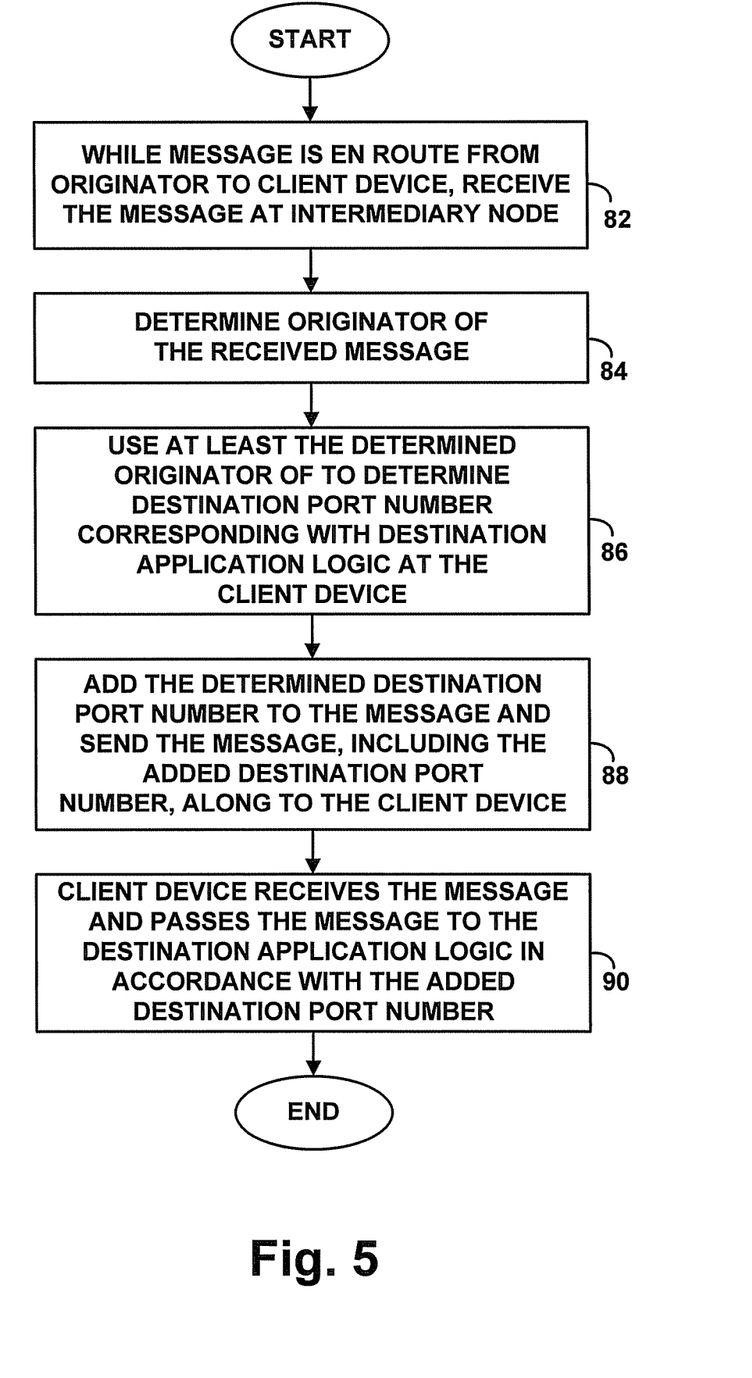
FIG. 5 is a flow chart depicting functions that can be carried out in accordance with the exemplary method.

FIG. 5 is next a flow chart depicting functions that can be carried out in accordance with the exemplary method, to facilitate routing a message (such as an SMS message) to particular application logic on a client device (such as a WCD). As shown in FIG. 5, at block 82, while the message is en route from an originator of the message to the client device, a network node receives the message. At block 84, after receiving the message, the network node determines the originator of the received message. And at block 86, the network node then uses at least the determined originator of to determine a destination port number at the client device, where the destination port number corresponds with the particular application logic on the client device. At block 88, the network node then adds the determined destination port number to the message and sends the message, including the added destination port number, along to the client device. As a result, at block 90, when the client device receives the message, the client device will pass the message to the particular application logic on the client device in accordance with the added destination port number, for processing of the message by that application logic.

In practice, the destination port number added into the message by the node will thus be a port number that the client device associates with particular application logic on the client device. The particular application logic may itself be the destination application, such as one of the types of applications described above for instance. Alternatively, if the client device has a destination port number associated with a proper subset of the client device's applications (such as those applications provided by or otherwise associated with a particular message originator), the particular application logic could be a message-management module that the client device associates with that subset of applications. (In practice, if the message originally designated a destination port number associated with a given application, the port-insertion intermediation function could replace that port number with the destination port number associated with the application group that contains the given application. Further, the port-insertion intermediation function could insert a sub-port number that the group's message-management module could use as a basis to route the message to the destination application of the group.) In this manner, the method can help to conserve port numbers on the client device.

An exemplary embodiment has been described above. Those of ordinary skill in the art will appreciate, however, that numerous variations can be made from the embodiment described, while remaining within true scope and spirit of the invention as defined by the claims.

What is claimed is:

1. A method for routing an SMS message to particular application logic on a client device, wherein the client device is a wireless communication device, the method comprising:

while the message is en route from an originator of the message to the client device, receiving the message at a network node;

after receipt of the message, the network node determining the originator of the received message and the network node determining a message content footprint of bearer data of the received message;

the network node using at least the determined originator to determine a destination port number at the client device, wherein the destination port number corresponds with the particular application logic on the client device, and wherein using at least the determined originator to determine the destination port number comprises using at least the determined originator and the determined message content footprint cooperatively as a basis to determine the destination port number; and the network node adding the determined destination port number to the message and sending the message, including the added destination port number, along to the client device, whereby when the client device receives the message, the client device passes the message to the particular application logic on the client device in accordance with the added destination port number, for processing of the message by the particular application logic.

2. The method of claim 1, wherein the network node comprises a short message service center (SMSC), wherein receiving the SMS message at the network node comprises receiving the SMS message as a short message peer-to-peer protocol (SMPP) message, and wherein sending the SMS message comprises sending the SMS message via Signaling System #7 (SS7) from the SMSC to a mobile switching center (MSC) for transmission of the SMS message via an air interface to the WCD.

3. The method of claim 1, wherein the network node comprises an intermediary disposed at an ingress or egress of a short message service center (SMSC), wherein the SMSC stores and forwards the SMS message.

4. The method of claim 1, further comprising:

maintaining data that correlates SMS message originators with destination port numbers, wherein using at least the determined originator to determine the destination port number at the WCD comprises referring to the data to determine the destination port number based on the determined originator.

5. The method of claim 4, further comprising maintaining the data at the network node.

6. The method of claim 1, further comprising:

the network node determining the destination WCD, wherein using at least the determined originator to determine the destination port number comprises using at least the determined originator and the determined destination WCD cooperatively as a basis to determine the destination port number.

7. The method of claim 6, further comprising:

maintaining data that correlates SMS originators with destination port numbers for particular WCDs or groups of WCDs, wherein using at least the determined originator and the determined destination WCD cooperatively as a basis to determine the destination port number comprises referring to the data to determine the destination port number based on the determined originator and the determined destination WCD.

8. The method of claim 1, further comprising:
maintaining data that specifies particular port numbers for combinations of SMS originators and message content footprints,
wherein using at least the determined originator and the determined message content footprint cooperatively as a basis to determine the destination port number comprises referring to the data to determine the destination port number based on the determined originator and the determined message content footprint.

9. The method of claim 1, further comprising:
the network node determining the destination WCD,
wherein using at least the determined originator and the determined message content footprint cooperatively as a basis to determine the destination port number comprises using at least the determined originator, the determined message content footprint, and the determined destination WCD cooperatively as a basis to determine the destination port number.

10. The method of claim 9, further comprising:
maintaining data that specifies particular port numbers for combinations of SMS originators, message content footprints, and WCDs,
wherein using at least the determined originator, the determined message content footprint, and the determined destination mobile device cooperatively as a basis to determine the destination port number comprises referring to the data to determine the destination port number based on the determined originator, the determined message content footprint, and the determined destination WCD.

11. The method of claim 1, wherein the WCD is programmed with a plurality of applications, wherein the particular application logic comprises a message-management module for a proper subset of the plurality of applications, wherein the message-management module operates to receive and forward messages to applications of the proper subset,
whereby when the WCD receives the SMS message, the mobile device passes the SMS message to the message-management module in accordance with the added destination port number, and whereby the message-management module selects an application of the proper subset based on content of the SMS message and provides the SMS message to the selected application for processing.

12. A system for routing a short message service (SMS) message to particular application logic on a mobile device, the system comprising:
a network interface for receiving the SMS message while the SMS message is en route from an originator of the SMS message to the mobile device and for outputting the SMS message for transmission to the mobile device; and
a processor, wherein the processor has access to correlation data stored in a data storage medium, the correlation data defining correlations between at least (i) SMS message content footprints and (ii) destination port numbers;
wherein the after receipt of the SMS message at the network interface, (a) the processor reads the SMS message to determine the originator of the SMS message, (b) the processor refers to the correlation data to determine, for the message from the originator, a destination port number based on at least the determined SMS message content footprint, wherein the destination port number corresponds with the particular application logic on the mobile device, (c) the processor then adds the determined destination port number to the SMS message, and the processor then passes the SMS message to the network interface for transmission of the SMS message, including the added destination port number, to the mobile device,
whereby, when the mobile device receives the SMS message, the mobile device passes the SMS message to the particular application logic on the mobile device in accordance with the added destination port number, for processing of the SMS message by the particular application logic.

13. The system of claim 12, wherein the network interface comprises a separate network input interface for receiving the SMS message and network output interface for sending the SMS message.

14. The system of claim 12,
wherein at least the network interface and processor are components of a short message service center (SMSC),
wherein the network interface receives the SMS message as a short message peer-to-peer (SMPP) protocol message, and
wherein the network interface sends the SMS message via Signaling System #7 (SS7) from the SMSC to a mobile switching center (MSC) for transmission of the SMS message via an air interface to the mobile device.

15. The system of claim 14, wherein the correlation data is stored at the SMSC.

16. The system of claim 12, wherein the system is disposed at an ingress or egress of a short message service center (SMSC), wherein the SMSC stores and forwards the SMS message.

17. A method for routing a short message service (SMS) message to particular application logic on a wireless communication device (WCD), the method comprising:
while the SMS message is en route from an originator of the message to the WCD, receiving the SMS message at a network node;
after receipt of the message, the network node determining a message content footprint of bearer data of the received SMS message;
the network node using at least the determined message content footprint to determine, for the SMS message from the originator, a destination port number at the WCD, wherein the destination port number corresponds with the particular application logic on the WCD; and
the network node adding the determined destination port number to the SMS message and sending the SMS message, including the added destination port number, along to the WCD,
whereby when the WCD receives the SMS message, the WCD passes the SMS message to the particular application logic on the WCD in accordance with the added destination port number, for processing of the SMS message by the particular application logic.

18. The method of claim 17,
wherein the network node comprises a short message service center (SMSC),
wherein receiving the SMS message at the network node comprises receiving the SMS message as a short message peer-to-peer protocol (SMPP) message, and
wherein sending the SMS message comprises sending the SMS message via Signaling System #7 (SS7) from the SMSC to a mobile switching center (MSC) for transmission of the SMS message via an air interface to the WCD.

19. The method of claim 17, wherein the network node comprises an intermediary disposed at an ingress or egress of a short message service center (SMSC), wherein the SMSC stores and forwards the SMS message.

20. The method of claim 17, wherein the WCD is programmed with a plurality of applications, wherein the particular application logic comprises a message-management module for a proper subset of the plurality of applications, wherein the message-management module operates to receive and forward messages to applications of the proper subset, whereby when the WCD receives the SMS message, the mobile device passes the SMS message to the message-management module in accordance with the added destination port number, and whereby the message-management module selects an application of the proper subset based on content of the SMS message and provides the SMS message to the selected application for processing.

* * * * *